J. J. Greenough,
Pegging Machine,
No. 699, Reissued Apr. 26, 1859.
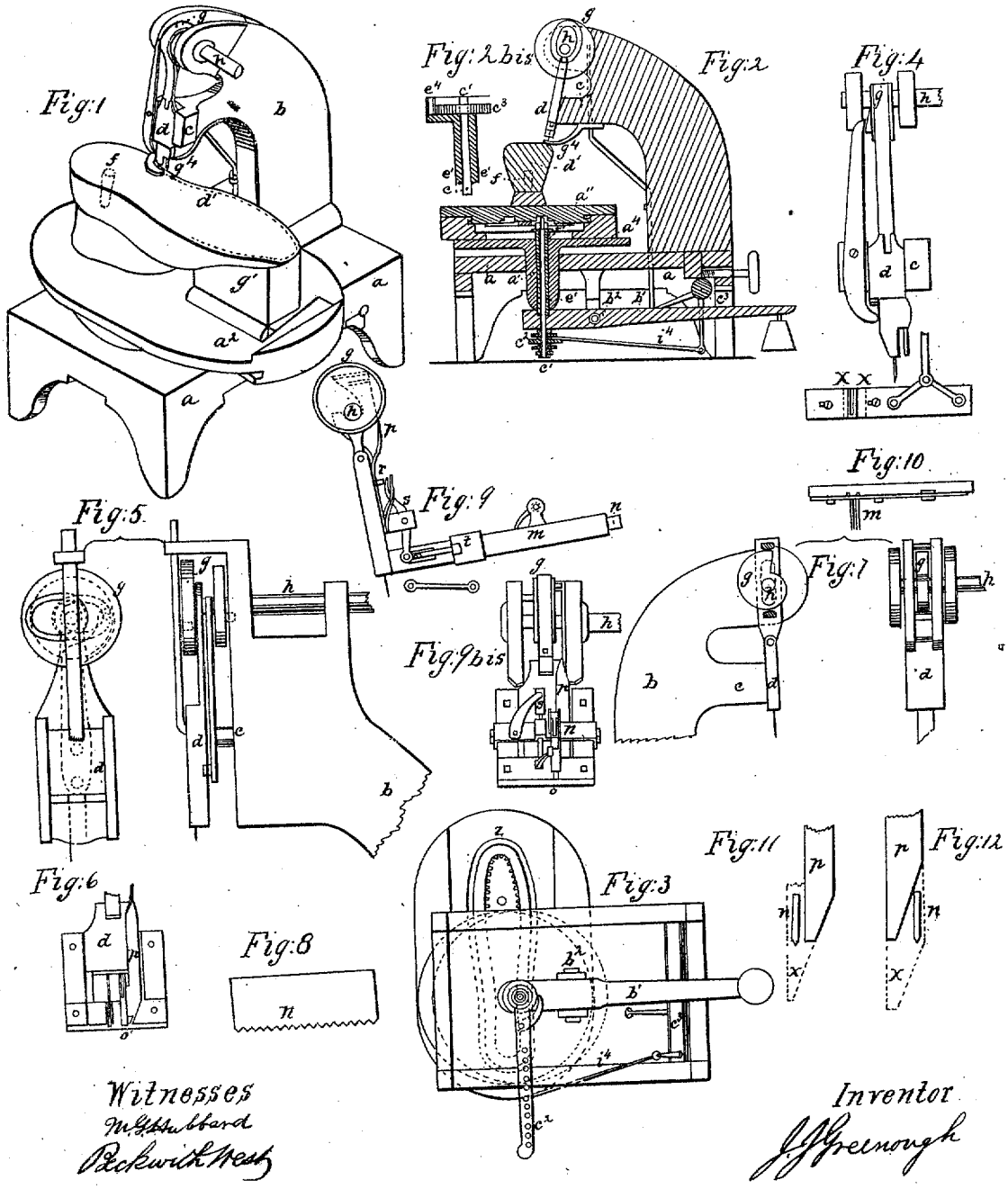
Witnesses
M. G. Hubbard
Rockwith Mesh
Inventor
J. J. Greenough

UNITED STATES PATENT OFFICE.

JOHN JAMES GREENOUGH, OF NEW YORK, N. Y.

IMPROVEMENT IN MACHINES FOR PEGGING BOOTS AND SHOES.

Specification forming part of Letters Patent No. 10,427, dated January 17, 1854; Reissue No. 269, dated July 4, 1854; Reissue No. 699, dated April 26, 1859.

*To all whom it may concern:*

Be it known that I, JOHN JAMES GREENOUGH, of the city, county, and State of New York, have obtained Letters Patent of the United States, dated the 17th day of January, 1854, for several inventions in Shoe-Pegging Machinery, which I now desire to separate and to have reissued to me in several distinct patents; and I do hereby declare and ascertain one of said inventions contained in said Letters Patent, referring to the accompanying drawings, in which—

Figure 1 is a perspective view of the machine; Fig. 2, a vertical section; Fig. 3, a plan from below; Fig. 4, an awl and peg-stock detached; Fig. 5, modifications; Fig. 6, a front view of pegging-stock, &c.; Fig. 7, a modified section; Fig. 8, peg-wood; Fig. 9, peg feed; Figs. 10, 11, 12, peg-cutters.

My improvement herein described is for the purpose of feeding the hole in the shoe forward into exact position to receive a peg in the operation of pegging, so as to peg around the sole of a shoe of any form, or in any direction across it that may desired.

Before my invention various independent means had been attempted for feeding or moving the shoe to be pegged, but none were sufficiently accurate in executing the work with rapidity, and in all cases of which I have any knowledge mechanisms more or less complex were used independent of the apparatus for punching the holes and pegging. My mode of feeding is by the use of the awl that forms the holes into which the pegs are inserted, and moves the sole to bring each hole in succession when made directly in line to receive the peg before the awl is withdrawn from the sole. It will be obvious that if the shoe were moved by any other means than the awl while in the hole into which the peg must be driven that any turning of curved work or any want of adjustment between the feed apparatus and awl and peg driver would affect the result, and propably prevent the machine from working, beside complicating the machine.

The mode of application which I adopted is as follows: The peg-driver and awl work in concert. They may be put into two sliding stocks, but I prefer that they be inserted into one. This stock has an up-and-down motion, given to it by a cam or other analogous device, so as to drive the awl and peg at the same instant into the sole of the shoe or boot. In addition to the up-and down motion, I give the awl a lateral motion, or a motion sidewise at right angles to the puncturing motion, or nearly so, moving it sidewise by any suitable device, such as a cam or crank motion that shall move it steadily and positively. The movement of the awl is as follows: It is driven down into the shoe, then sidewise, carrying the shoe with it a sufficient distance to space off the distance between the pegs, then rises or is drawn out of the shoe and returned back to its first position, leaving the hole it has just made directly in line with the peg that is to be driven; and it will be perceived that this effect is to be produced whether the pegs are inserted in a straight line or in a line curved in any direction, as the sole is swiveled on the line for inserting the pegs as an axis of motion. To effect this very desirable object it is also necessary to move the peg-driver out of the way to enable the awl to bring the hole in line with the peg-driver, and then back again to the position where the awl was when it left the hole, in order to place the peg in proper position to drive. This may be done by uniting the two that they may move in unison, or by drawing the latter back. I prefer the former way, and have so represented it in the drawings.

The construction is as follows: The apparatus for forming the pegs and feeding them into the driving apparatus consists of a trough, *m*, through which strips of wood are fed, made like the ordinary pegs used in shoe-manufacture, but only split off one way, so as to present a series of pegs in a row (as seen in Fig. 8) attached together in a strip. The strip of peg-wood is fed forward at intervals, the breadth of a single peg at a time, by a feed that is perpetual, or such as will feed an infinite series of pegs in succession. This may be effected by a variety of apparatus—such as feed-rollers or a feed-roller and spring, or an endless screw working into the lower serrated edge of the peg-wood, or by the device shown in the drawings at Fig. 9, all of which are well-known endless feeds, and are but the equivalents of each other. The device shown at Fig. 9 is a reciprocating feed, in which *m* is the trough through which the peg-wood *n* passes.

On this trough, or beside it, there is a slide, *t*, that is made to slide by a vibrating lever, *s*, to the lower end of which it is attached by a connecting-rod. The lever *s* is vibrated by the up-and-down motion of the pegging-stock, heretofore described, so that when the peg-driver stock rises the peg-wood is fed forward and cut off ready to be driven as the peg-driver stock descends. To cut off the peg properly a cutter must pass through it in a line perpendicular to the top and bottom lines of the peg-strip and at right angles to the side thereof, the cut being made from side to side through the peg-strip without regard to the course of the grain of the wood. This cut may be made by forcing a knife having an inclined back downward so as to cut across the peg-wood, as seen in Fig. 11, in which *a* is the cross-section of the peg-wood, *b* the knife in position before the cut is made, *c* dotted lines showing the cut made.

Fig. 12 shows a modification in which the edge of the cutter is inclined, which performs a somewhat similar action by being pushed downward into the position shown by the dotted lines *x*. Another mode is to force the edge of a knife that is parallel with the side of the peg-strip straight forward across it, in a plane of motion at right angles thereto, as seen in Fig. 10, the dotted lines showing the range of motion. The combined action of these parts is, first, forcing forward the peg-wood into the recess, and, secondly, cutting off with the knife, which is actuated by a cam, crank-pin, or eccentric from the driving-shaft.

To move the shoe or boot by the awl, it is driven into the sole. The stock is then moved sidewise by a cam or other equivalent device. The stock may either slide sidewise or turn on an arm of sufficient radius to change the angle of the awl a little. Fig. 4 shows the first, and Fig. 5 the second, method. The side movement of the stock when the awl is in the shoe-sole carries the shoe along the same distance, and brings the hole thus made in the sole into line with the peg when driven, the effect being the same whether the sole is carried along straight or is swiveled to peg around a curve, the motion of the shoe being entirely dependent upon the awl as a center.

To hold the shoe and properly present the sole to be pegged, I employ what I denominate a "universal-movement" carriage or holder. This is designed to give the shoe all the necessary movements to bring each portion of the edge of the curved and undulating sole up to a stationary point to receive a line of pegs all round. To effect this I employ a horizontal lever, $b'$, Fig. 2, on one end of which I support a standard, $a'$, on the top of which standard there is a horizontal plane, $a''$. This is counterbalanced by a weight at the opposite end of the lever $b'$, the fulcrum being at $j^2$. On the top of this plane two slides, one above the other, have a motion at right angles to each other, as clearly seen in Fig. 2, and on the top of the upper one the shoe is affixed. Now, it will be seen that if the lower plane has a revolving motion a movement in any direction can be effected, and, if there is a gage at $g^4$ on the standard for the shoe to rest against, it will be kept in place while being moved by the awl, guided by the operator in any direction.

It is obvious that if the plane had a motion up and down, and the plate on which the shoe was clamped could slide freely on it without guides, the same effect might be produced.

Having thus fully described my improvement in feeding forward the soles of shoes and boots to receive the pegs in the act of pegging, what I claim therein, and desire to secure by Letters Patent, is—

The moving the sole of the shoe along by means of the awl that forms the hole in which the peg is inserted, in combination with the peg-driver, whether the peg-driver be or be not employed to perform the additional function of presenting the peg, whereby each hole made by the awl is brought in succession in line for inserting the peg before the awl is withdrawn, as set forth.

J. J. GREENOUGH.

Witnesses:

JAS. W. FRASER,
SYLVESTER LAY.